United States Patent Office 3,350,226
Patented Oct. 31, 1967

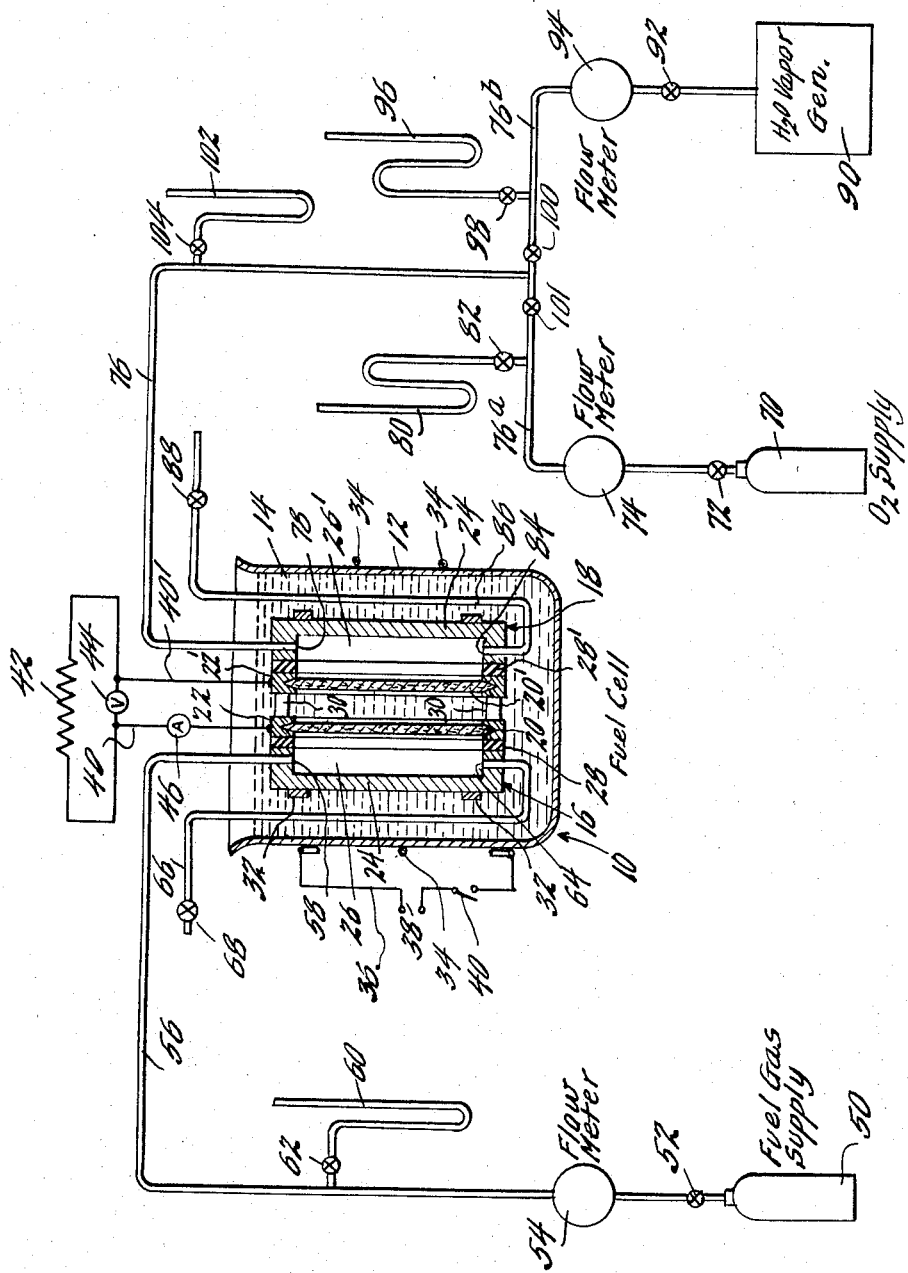

3,350,226
METHOD OF SUPPRESSING CORROSION IN FUEL CELL CONTAINING ALKALINE HYDROXIDE ELECTROLYTE
Harry C. Lieb, Rockville Centre, and Anthony M. Moos, Ossining, N.Y., assignors to Leesona Corporation, Cranston, R.I., a corporation of Massachusetts
Filed Nov. 22, 1961, Ser. No. 154,276
6 Claims. (Cl. 136—86)

This invention relates to the art of electrochemical generation of electrical energy and is more particularly concerned with the generation of such energy by means of devices known as "fuel cells."

Background

It is well known that the free energy of a combustible fuel can be converted directly into electrical energy by the reaction of the fuel with the oxidizing gas in an electrochemical cell commonly referred to as a "fuel cell." Basically, the fuel cell includes two gaseous diffusion electrodes in mutual contact with an electrolyte, the fuel gas being supplied to one electrode, usually denominated the "fuel electrode," and the oxidizing gas to the other electrode, usually denominated the "oxygen electrode" since oxygen either alone or in admixture with other gases, e.g. as in air, ordinarily constitutes the oxidizing gas. According to current theory, oxygen molecules from the oxiding gas are adsorbed (chemisorbed) on the surface of the oxygen electrode, the positive electrode or cathode, to become ionized and de-adsorbed as free oxide ions leaving electrical charges of one polarity on the electrode; oxygen is transported in the form of oxygen-containing ions through the electrolyte from the oxygen electrode to the fuel electrode, the negative electrode or anode; and the fuel gas is adsorbed onto the surface of the fuel electrode, combining with oxygen from the oxygen-containing ions to form a combustion product, the fuel electrode acquiring in the process electrical charges of opposite polarity. When the two electrodes are connected into an electrical circuit, a flow of electrons will thus take place, producing an electrical current.

Out of the extensive experimental activity in this field have evolved two broad categories of cells: the so-called "high temperature" fuel cells and the so-called "low temperature" fuel cells. The latter are essentially characterized by operation at temperatures up to about 250° C. and utilization as electrolytes of aqueous alkaline solutions containing substantial amounts of water, say roughly 40–60%. In addition, hydrogen is normally employed as the fuel due to the difficulty in obtaining satisfactory reaction with carbonaceous fuels at such temperatures. Obviously, at temperatures above 100° C. water will be lost from the system unless its evolution is prevented; consequently, low temperature cells are typically pressurized to permit operation above 100° C. Higher temperatures and pressures are also employed to promote an overall increase in the efficiency of the cell. At the present development of the electrode art, only low efficiencies are practical at temperatures below 100° C.

It will be apparent that a low temperature cell having these characteristics is subject to certain serious disadvantages. To begin with, stronger, heavier, and more bulky equipment as well as more complex control devices are necessary for pressurization, materially increasing the overall weight of the system and correspondingly decreasing its power-to-weight ratio. One of the principal competitive advantages of the fuel cell over other electrical generating equipment is the ability to generate a given amount of power by equipment having a substantially lesser weight, and as the power-to-weight ratio decreases, the use of the cell becomes less attractive in comparison with competitive devices. Second, pressurization hinders disposal of water produced at the fuel electrode as the main product of the reaction where hydrogen gas is the fuel, leading to an alteration in electrolyte concentration. This violates one of the ideal requirements of the fuel cell, that the composition of the electrolyte remain constant to avoid limiting the performance capabilities of the cell. Third, an aqueous electrolytic solution inherently introduces a Helmholtz double layer adjacent the electrode surfaces, the effect of which is to cause a decrease in electrical potential during operation. Fourth, aqueous solutions are subject to loss of potential for another reason, known as concentration polarization, which becomes especially significant where the current being drawn from the cell is high. Concentration polarization has reference to the irreversible energy losses involved in the mass transport of electrolyte ions in those zones adjacent the electrode surfaces where the ions are highly concentrated. Finally, aqueous electrolytes and the pressurization required for their use render more critical the problem of controlling the gas pressure and the internal pressure of the cell to maintain the proper delicate balance in the pressures acting upon the opposite sides of the electrode to prevent the equally undesirable conditions of the gas being passed unreacted through the electrode, on the one hand, and the electrolyte penetrating unduly into the electrode to "drown" its pores, on the other. Other difficulties exist but these are perhaps most significant.

Becoming cognizant of the disadvantages inherent in a cell employing aqueous alkaline electrolyte solutions, workers in the field have concentrated on finding other suitable electrolytes which eliminated at least some of these problems. Ideally, the requirements of a good electrolyte might be more easily satisfied by a crystalline solid conductor of oxygen ions, i.e. a solid state electrolyte characterized by the conductivity due to the presence of imperfections in its crystalline lattice. However, past efforts to prepare such an electrolyte were unsuccessful [Baur and Preis, Z. Elektrochem., 43, 727 (1937); 44, 695 (1938)]. As an alternative, an early Russian investigator, Davtyan, proposed the use of a complex mixture of monazite (primarily lanthanum, cerium, and thorium ortho-phosphate), sodium carbonate, tungsten trioxide and soda glass. Perhaps as a result of this discovery, more recent efforts have focused on the alkali metal carbonates as the electrolyte. Thus, the great bulk of the late patent art pertaining to fuel cells having non-aqueous electrolytes contemplates that the electrolyte consists essentially of an alkali metal carbonate (U.S. Patents 2,384,463, 2,830,109, 2,901,524, and 2,914,596).

In all cases, the operation of these cells has been at very high temperatures such as at least 500° C. and more typically 600° C. or higher, compared to those at which the aqueous electrolyte cells are operated. Indeed, the use of temperatures of this high order appears to be essential to the operation of fuel cells having a fused alkali metal salt as the electrolyte in order to secure sufficient ionization of these compounds for current flow.

Although cell operation at high temperatures is desirable from the standpoint of electro-kinetic efficiency, there are certain rather obvious disadvantages implicit in a system having extreme temperatures as a prerequisite to its proper functioning. In the first place, although both classes of cells require an external source of heat to initially achieve operating temperature, the much higher threshold temperature of a high temperature cell means that the source must be more elaborate and will consume more energy. In the second place, even assuming that the reaction, once initiated, is self-sustaining as to heat requirement, which is to say that the proportion of the overall energy of the reaction converted into heat is sufficiently great to maintain operating temperature, this heat must be conserved insofar as possible for this purpose and prevented from being lost to the ambient atmosphere. Accordingly, high temperature cells must be provided with effective insulation to minimize heat losses, which insulation adds to the weight and bulkiness of the system, reducing its power to weight ratio. Furthermore, it is much preferred that as much as possible of the overall energy of the reaction be converted into electrical energy rather than into heat energy, as heat losses are irreversible and reduce the basic efficiency of the system in terms of the ratio of electrical output to total available energy. Finally, there are the simple practical difficulties of maintaining and operating systems at such temperatures with regard to the protection of the surroundings and operating personnel from injury, the prevention of explosions, et cetera.

*Objects of the invention*

An important object of the present invention is, therefore, a fuel cell of the fused electrolyte type, which is consequently free of the difficulties present in cells having an aqueous electrolyte, wherein the electrolyte is adapted for satisfactory performance at temperatures below those required for prior art fused salt electrolytes and preferably within the same range as low temperature, aqueous electrolyte cells.

Another object of the invention is a class of alkaline electrolytes suitable for fuel cells, which class permits operation of the cell without pressurization at temperatures above the boiling point of water, thereby promoting the electro-kinetic efficiency of the cell as well as the removal of the water of reaction, but are capable of undergoing fusion at temperatures of not greater than about 400° C. and preferably less than about 300° C., eliminating the need for extensive insulation and complex control devices for the cell.

Our investigations have established that these and other fundamental objects of the invention are satisfied through the use as the electrolyte for a fuel cell of a eutectic mixture of two or more hydroxides of alkali metal or alkaline earth metal, the melting point of which is less than about 400° C. In the course of working with these mixtures for this purpose, we have also discovered a novel technique for reducing the corrosive propensities of these strong alkalies for the gaseous diffusion electrodes with which they are necessarily in contact.

The invention, accordingly, contemplates as an additional object the selection of conditions whereby the cell may be operated for relatively long periods of time without undue corrosive effects on the gaseous diffusion electrodes and without undue loss in available potential due to increase in the internal resistance of the cell.

Other significant features and advantages will be readily apparent to one skilled in the art from the following detailed description when read in conjunction with the accompanying drawings, in which:

The figure is an illustration, essentially schematic in nature, of a typical fuel cell arrangement, suitable primarily in the form shown for test or experimental purposes, in which the improved electrolyte of the invention finds application and by which the process aspects of the invention may be put into practice.

*General description of cell*

An understanding of the improvements contemplated herein will be facilitated by a brief explanation of the typical fuel cell arrangement depicted schematically in the figure. In this figure, the numeral 10, as the legend indicates, designates the cell proper, shown in cross-section, which comprises an external casing 12, illustrated simply as an open-ended vessel or container, filled with an electrolyte 14 to a sufficient depth to easily accommodate and entirely cover the other elements of the cell. For reasons hereinafter apparent, container 12 is desirably constructed of nickel, or even better, a suitable plastic resistant to combinations of moderately high temperatures and strong alkalis. Suspended below the surface of electrolyte 14 are the gaseous diffusion electrode sub-assemblies 16 and 18, respectively. Each sub-assembly comprises a thin porous electrode element 20, 20', of disc-like shape for example, having one face in contact with the electrolyte. To facilitate handling and mounting, each electrode element is preferably encircled and retained in an annular metal rim, which may advantageously be formed of nickel also. In operation, the faces of the electrodes opposite those exposed to the electrolyte are in contact with a fuel gas and an oxidizing gas, respectively, and in order that the gases may be introduced into these faces in isolated relationship to the electrolyte, each electrode is associated with a dished or flanged metallic backing plate 22, 22' defining with the electrode a gas cavity or chamber 24, 24'. A gas-tight seal between the outer margins of backing plates 24, 24' and annular rims 22, 22' is provided by an annular gasket 28, 28'. The two electrode sub-assemblies are maintained in predetermined distance apart by spacers 30 disposed between the mutually facing edges of rims 22, 22' at spaced peripheral points therearound so as to allow free circulation of the electrolyte from vessel 12 through the space between the adjacent electrode faces. The entire assembly is, in turn, held together in any desired manner, such as by clamps or bands indicated diagrammatically at 32. Obviously, gaskets 28, 28' and spacers 30 must be constructed of dielectric material to keep from short-circuiting the electrodes, and one dielectric found particularly satisfactory as regards resistance to attack by a strongly alkaline electrolyte is polytetrafluoroethylene.

The electrolyte contemplated by the present invention exists in the solid state at room temperature and must be supplied with heat from an external source when the cell is initially put into operation. This can be accomplished in any one of a variety of ways, one example of which is an electrical resistance heater or coil 34 wound several times around the exterior of vessel 12 and connected at its ends by electrical leads 36 to any desired source of current indicated at 38. For systems operating at fairly high current drains, the supply of heat from the external sources is usually unnecessary once operating temperature has been attained, the energy loss in the form of heat being sufficient to maintain such temperature. In this case, once this condition obtains, heater 34 may be disconnected from current source 38 by opening switch 40. At lower currents, some heat from the external source may be needed to supplement that provided by the reaction.

The cell necessarily includes an electrical circuit between the two electrodes and a rudimentary form of circuit is indicated in the figure. This circuit consists of leads 40, 40' connected at one end to the annular retaining rim of the respective electrode element and to any desired load at the other end, this load being symbolized in the drawing by a resistance 42. The circuit may also desirably include various instruments for measuring the electrical output of the cell, such as, for example, a voltmeter 44 and an ammeter or milliammeter 46.

Up to this point, the description has been confined to the essential elements of the cell itself. In addition, the system as a whole includes means for supplying to the cell both the oxidizing gas and the fuel gas. To this end, there is provided an external source of the fuel gas, which, for convenience, is shown as a pressurized container 50 having an outlet valve 52. This outlet is connected to the inlet of a flow meter 54 having its outlet connected, in turn, by suitable piping 56 to one or more ports 58 formed for this purpose in backing plate 24 and through which the fuel gas is introduced into the fuel gas chamber 26. The pressure at which the gas is supplied to the cell is measured by an appropriate pressure gauge tapped into line 56, which gauge may be merely a simple liquid manometer 60 capable of being shut off from line 56 by a valve 62, although other more elaborate instruments are known for this purpose and can be substituted if desired. To maintain the desired fuel gas pressure in chamber 26 against the face of electrode 20 (the fuel electrode) and/or to discharge reaction products from the chamber, backing plate 24 preferably includes one or more outlets 64 communicating with an outlet line 66 terminating in a control valve 68. In similar fashion, the oxidizing gas is supplied to gas chamber 26' of electrode sub-assembly 18 (the oxygen electrode) from a high pressure supply container 70 through an outlet valve 72, a flow meter 74 and a line 76 connected to one or more inlet ports 78 in backing member 24'. The oxygen-pressure can be read from a liquid manometer 80 or other pressure gauge tapped into line 76 through a cut-off valve 82. The gas chamber of the oxygen electrode sub-assembly may be vented to the atmosphere through one or more outlet ports 84 provided in backing plate 24 in communication with an outlet line 86 ending in a discharge valve 88.

One of the important features of the invention is the provision of means for introducing controlled quantities of water vapor into the oxidizing gas being supplied to the cell for reasons to be hereinafter explained more fully. To permit this, the system includes a generator for producing steam or other water vapor indicated diagrammatically at 90, the vapor from which is fed into the oxygen supply line in any appropriate manner. Thus, for instance, assuming that the generator is of a type producing steam under pressure, the steam therefrom is fed through a valved outlet 92 to a flow meter 94 and thence into a branch 76b of line 76, another branch 76a of which communicates through flow meter 74 with the oxygen supply container. A pressure gauge such as a liquid manometer 96 communicates with branch line 76b through a valve 98 for observation of the steam or water vapor pressure. The pressure and flow in each of branches 76a, 76b is controlled by means of regulating valves 100 or 101 located upstream from the juncture of each branch from main line 76. If desired, the total pressure in the main line can be ascertained by means of a suitable pressure gauge, which, as in other instances, may take the form of a liquid manometer connected to line 76 through a cut-off valve 104 at a location downstream of the junction of that line with its branches.

It will be appreciated that a rather elementary type of system has been selected for purposes of illustration here, only enough elements being shown as is necessary to convey to one skilled in the art an understanding of an apparatus suitable for the practice of the invention. Obviously, since the system is capable of considerable modification, especially by way of refinement and elaboration, it is not to be inferred that the improvements of the invention are restricted in their application to the particular cell design of the drawings.

*Improved electrolyte of the invention*

Having thus far described a basic cell design and those of its components essential for present purposes, the description can now be directed to particular aspects of the cell and its operation which make up the present invention. One such aspect is the use as the electrolyte of the cell of a eutectic mixture of two or more alkaline hydroxides which is fusible at a temperature not greater than about 400° C., the hydroxides being selected from among the alkali metal and alkaline earth metal hydroxides. It is contemplated herein that the class "alkali metals" is embracive of lithium, sodium, potassium, rubidium and cesium, while the class "alkaline earth metals" is embracive of the calcium, barium and strontium. In other words, the former term has reference to the metals of Group IA of the Periodic Table, while the latter term has reference to Group IIA, exclusive of radium. These two classes or groups of compounds are sometimes classified as the very active metals. While their hydroxides are in all cases known and the melting points thereof available in any standard reference work, for convenience, the several compounds and their melting points are listed in the following table:

TABLE I

| Compound: | Melting point, degrees C. |
|---|---|
| Lithium hydroxide | 400 |
| Sodium hydroxide | 318.4 |
| Potassium hydroxide | 360 |
| Rubidium hydroxide | 300 |
| Cesium hydroxide | 272 |
| Calcium hydroxide—loses water at | 450 |
| Barium hydroxide | 325 |
| Strontium hydroxide | 375 |

By definition, eutectic mixtures have a lower melting point than their individual constituents; consequently, their use attains the desirable objective of permitting operation of the cell at the lowest possible temperature, thereby deriving the maximum possible advantage over fusible electrolytes heretofore known in the art. Obviously, a variety of eutectic combinations are possible and no attempt will be made herein to describe all of them. For purpose of illustration, several representative systems are set forth in the following table together with their approximate molar ratios and melting points:

TABLE II

| System | Molar Ratio | Melting Point, Degrees C. |
|---|---|---|
| LiOH-NaOH | 74–56 | 220 |
| LiOH-KOH | 70–30 | 227 |
| SrOH-BaOH | 37–63 | 360 |
| NaOH-KOH | 50–50 | 169 |
| NaOH-RbOH | 73.5–26.5 | 236 |
| NaOH-LiOH-KOH | 43–5–52 | 167 |

For obvious reasons, the particular eutectic mixture selected must possess a reasonable specific conductance at its melting point, preferably at least about 1 ohms$^{-1}$ cm.$^{-1}$. For example, the eutectic of sodium and potassium hydroxides has a specific conductance of 1.49 ohms$^{-1}$ cm.$^{-1}$ at its melting point of 169° C. and 2.63 ohms$^{-1}$ cm.$^{-1}$ at 230° C. The Kohlrausch technique for the determination of a specific conductivity with a Wheatstone bridge and a thermonic valve oscillator is well known and requires no further elaboration here. In the determination of the above values, the oscillator was operdated at 1 kc.

As will be appreciated from an understanding of eutectics generally, it is not an absolute requirement that the composition of the mixtures of hydroxides contemplated herein coincide precisely with the eutectic point of the particular system. Mixtures having compositions in the general vicinity of, but varying to some extent from, the exact composition at the eutectic point will nevertheless possess a melting point substantially depressed from the melting point of the individual constituents. The following will illustrate the degree of latitude that is permissible in the case of binary systems: for the system sodium hydroxide-potassium hydroxide, the mol percent may be in the range of 40–60:60–40; for the system lithium hydroxide-potassium hydroxide, the mol percent may be in the range 20–40:80–60; while for the system sodium hydroxide-lithium hydroxide, the mol percent may be in the range of 20–40:80–60. For ternary or higher systems, a considerable less degree of latitude is allowable because of their greater complexity, but, even here, some variation is possible. This may be illustrated by the system lithium hydroxide-potassium hydroxide-sodium hydroxide for which a satisfactory range of mol percentages has been found to be 2.5–7.5:49.5–54.5:40.5–45.5. Under these circumstances, it is to be understood that the term "eutectic mixture" or equivalent language appearing in this description or in the appended claims is intended to include not only mixtures which exactly coincide with the eutectic point but also mixtures which are in reasonably close proximity to that point and have melting points which are depressed almost as much from the melting points of the individual components as is the melting point of the precise eutectics.

As might be expected, the molten hydroxides described above tend to have a corrosive action upon the various inactive elements of the equipment, such as the electrolyte container, the cell casing, gas ducting, etc., all of which may be loosely considered as "cell hardware." However, this problem can be minimized or reduced to tolerable levels by constructing the metallic elements from nickel, or nickel-plated metal. Also, the noble metals appear to have reasonably good resistance to corrosion to these compounds at the intended range of operating temperatures. Alternatively, hardware of an inert ceramic or plastic may be substituted, where possible. In addition to corrosiveness, these electrolytes exhibit a tendency to fluoresce or crystallize along the sides of the container above the liquid-air interface. This may be eliminated by coating the hardware surfaces exposed to the atmosphere with a non-wettable substance, such as polytetrafluoroethylene. With respect to gasketing materials, the use of polytetrafluoroethylene is again advantageous, especially where partially embedded in the structural elements of the cell so as to eliminate possible changes in dimension during operation at relatively high temperatures.

The bulk of the experimentation upon which the present invention is based was carried out with cells using electrodes of the type described in U.S. Patent 2,716,670, which are now generally referred to as the so-called "Bacon electrodes." These electrodes are prepared, in general, by sintering nickel powder into a self-supporting electrode body of the desired size and configuration. According to a preferred embodiment, there is applied to one of the electrode faces a relatively thin layer of powdered nickel of a degree of subdivision finer than that constituting the main electrode body, which layer, after sintering, becomes an integral part of the electrode. In this manner, an electrode having different degrees of porosity on its two faces, i.e. a so-called "dual-porosity electrode," can be obtained. In such electrodes, a porosity of about 30 microns on the gas side, i.e. the side to be contacted by the gas, and a porosity of about 16 microns on the liquid side, i.e. the side to be contacted by the electrolyte, have been found quite suitable. The basic electrode body may be activated for use at the oxygen side of the cell by impregnation with a solution of an appropriate lithium compound followed by drying and heating at a relatively high temperature in an oxidizing atmosphere to convert the lithium compound as well as at least the surface layer of the porous nickel mass to the oxide. In the case of the fuel electrode, the basic body may also be activated in various ways, as by impregnation with nickel nitrate followed by roasting in air and heating in a reducing atmosphere to leave the surface in the metallic form. For a more complete description of these electrodes as well as of methods for their preparation, reference is made to the previously identified patent, British Patent 667,298, and the discussion in Young, Fuel Cells, Reinhold Publishing Co., New York, 1960, pp. 55–57.

In addition to the Bacon electrodes, use may be made of any oxygen electrode of the type described in U.S. Patent 2,914,596 which closely resembles the Bacon oxygen electrode, differing only in that previously prepared nickel oxide powder is assembled by sintering into the basic electrode body which is then impregnated with the lithium compound and heated to decompose that compound to the oxide. As a matter of fact, while we have not been able, due to considerations of time and expense, to study all of the various electrodes known from the literature, it is believed that the alkali metal and alkaline earth metal hydroxides are fundamentally operative as an electrolyte essentially independently of any particular combination of electrodes, especially where steps are taken to suppress the corrosive activity of electrolytes with respect thereto. This is not to say, of course, that certain electrodes might not be more practical than others under particular conditions; it is meant, rather, that on the basis of fundamental electro-kinetic considerations, the attainment of a flow of current from the cell is not deemed to be critically dependent upon or limited to certain special electrodes to the exclusion of all others. Accordingly, it is our expectation that virtually all the electrodes meeting the basic requirements for use in a fuel cell, i.e. conducting current, absorbing the gas in contact therewith, and catalyzing the reaction thereat, will be at least operative. As is well known, electrodes meeting these requirements may be constructed of a variety of materials including the noble Group VIII metals, nickel and copper or their oxides, and zinc oxide as well as basic structures of the more common metals activated by platinum or palladium. At our present level of understanding, dual porosity electrodes are considered most satisfactory although subsequent developments in electrode fabrication may result in a contrary conclusion.

In the light of this discussion, those skilled in the art should experience no difficulty in selecting specific electrodes for association with cells embodying one of the electrodes of the present invention.

As already indicated, the useful range of operating temperatures need not exceed about 400° C. and will be more often less than about 300° C. Under conditions requiring a heavier current drain from the cell, operation at the upper end of this range will usually prove more advantageous. However, we have obtained good performance compared to prior art cells at temperatures between about 225°–275° C., as will be borne out by the accompanying examples. The minimum temperature at which a current will be obtained will be that at which the electrolyte possesses sufficient conductivity to support a current. This will customarily be at at least the melting point of the electrolyte.

In the embodiment of the cell of the drawing, the electrolyte is at liberty to circulate between the adjacent electrode faces as dictated by thermal currents, concentration variations and other internal factors. A cell having this characteristic is known as a free electrolye cell and is especially convenient for test purposes. The choice of such a cell for illustrative purposes is not intended, however, to give rise to the implication that the improved electrolytes of the invention is restricted to cells of this design. Quite to the contrary, they are equally applicable to the so-called "diaphragm cell" wherein the electrolyte is included in, or contained by, a porous matrix or is in some other self-supporting form. For such a cell, a porous plate of inert material, such as magnesium oxide-aluminum oxide, or the like, or a mat of fibrous material, such as asbestos, may be saturated with the electrolyte mixture in molten form and arranged in juxtaposed contacting relationship with the adjacent electrode faces. Alternatively, the inert material may be added in powdered form to a quantity of the molten electrolyte in such proportion, e.g. 20–70%, that the resultant mixture can be cast into an integral self-supporting body for disposition in the same way as before within the cell. Other possibilities as to the physical condition of the electrolyte will occur to one familiar with cell fabrication and design.

The following examples illustrate the performance that has been obtained with cells employing as the electrolyte a eutectic hydroxide mixture of the type contemplated here. In these examples, reference will be made to "standard Bacon electrodes." These electrodes were prepared by the following procedure. For the oxygen electrode, powdered metallic nickel having an average particle size of 7–9 microns is mixed with ammonium bicarbonate powder in a particle size passed by a 100-mesh screen but retained by a 230-mesh screen in the proportion of 4:1 by weight. If desired, nickel carbonyl powder of the same particle size may be substituted for the metallic nickel powder. The ammonium bicarbonate serves as the spacing agent for the metallic particles in either case. A mold of suitable dimensions, usually 5 or 10 inches in diameter, is filled with this mixture and pressed lightly in a hydraulic press, after which it is placed in a gas furnace and heated to 1150° C. for two hours in a reducing atmosphere provided by forming gas to sinter the powder into a self-supporting structure. The sintered structure, after cooling, is removed from the mold and constitutes the substrate or coarse pore layer of the electrode to which the fine pore layer is to be applied. The coarse pore layer of the hydrogen electrode is prepared in an identical fashion except that the metallic powder used therefor has a particle size averaging 2–3 microns and sintering is accomplished by heating at about 850° C. for about ¾ of an hour. The formation of the fine pore layer is the same, for both types of coarse pore layers, the procedure being to coat one face of the sintered structure, using a paint brush, for example, with a suspension in alcohol, e.g. methanol, of nickel powder having an average particle size of 4–5 microns and heat the coated structure at 800° C. in the case of hydrogen electrode structures and 1000° C. in the case of oxygen electrode structures for about ¾ hour. If desired, nickel carbonyl powder of the same particle size may again be substituted. Additional coats of the metallic powder may be applied to the coarse pore layer, if desired, a total of two coats being preferred for the hydrogen structures and a total of three coats for the oxygen structures. The structures are reheated after each coat. At this stage, the structure consists in either case of a coarse pore layer or substrate having an integral fine pore layer on one face, which, for convenience, is hereinafter referred to as the "basic oxygen structure" or the "basic hydrogen structure" as the case may be.

Activation of the basic oxygen structure is accomplished by dissolving 65 grams of lithium hydroxide monohydrate (neutralized with nitric acid) and 1000 grams nickel nitrate hexahydrate in water to make one liter and impregnating the structure with this solution in a vacuum desiccator. The impregnated structure is then preoxidized in a furnace, the door of which is left open to admit air to provide an oxidizing atmosphere, at 700° C. for ¾ hour. The basic hydrogen structure is activated by impregnation in the same way with a solution of 1125 grams of nickel nitrate hexahydrate in sufficient water to make one liter and heating in the furnace in an oxidizing atmosphere provided by air at 450° C. for ¾ hour. After being allowed to cool, the structure is replaced in the furnace and heated for the same time and at the same temperature but this time in a reducing atmosphere provided, for example, by forming gas. If desired, 125 grams of thorium nitrate tetrahydrate may be added to the impregnating solution for the hydrogen structure. After activation, the electrodes are complete and ready for installation in the cell.

Preferably, the electrodes before being used are tested for the existence of non-uniform pore distribution which would allow gas to bubble unreacted through localized parts of its area. This test involves subjecting one face of the electrode, while immersed in water, to the pressure of an inert gas, e.g. nitrogen. The opposite face is observed and if bubbles appear at the selected pressure, which may range from about 2 to 12 inches of mercury dependent upon the pressure at which the cell is to be operated, the electrode is rejected as unsatisfactory. Electrodes passing this test are rated for use at the given gas pressure, referred to as the "bubble pressure."

In the examples, voltage is expressed in volts, current in amperes, current density in milliamperes per square centimeter, and temperature in degrees C., unless otherwise stated.

EXAMPLE I

A standard Bacon oxygen electrode and a standard Bacon hydrogen electrode, rated at a bubble pressure of 6 inches and 3.5 inches mercury, respectively, were installed in a test cell arranged according to FIG. 1, their adjacent faces being separated by a distance of 1 centimeter. The electrolyte was a mixture of sodium hydroxide and potassium hydroxide at a molar ratio of 50:50, having a melting point of 169° C. Oxygen and hydrogen, each at a pressure of 1 inch mercury, was admitted to the respective gas chambers and the resistance heater at the cell was activated. To determine the variation of the open curent (no-load) voltage as a function of temperature, this voltage was observed as temperatures between 107° C. and 215° C. with the following result.

| Temperature: | Open current voltage |
|---|---|
| 107 | 0.5 |
| 138 | 0.9 |
| 188 | 1.14 |
| 193 | 1.17 |
| 215 | 1.18 |

EXAMPLE II

The operation of the cell in Example I was continued at the highest temperature previously obtained (215° C.) but with an increase in hydrogen pressure to 2 inches mercury and an oxygen pressure to 4 inches mercury. At these pressures, the flow rate was 140 cc. per minute, and 50 cc. per minute respectively. The cell then was placed on load, which was gradually increased to determine the effect upon voltage of an increase in current drain. The following results were obtained.

| Current: | Voltage |
|---|---|
| 0.175 | 1.15 |
| 0.35 | 1.10 |
| 0.5 | 1.06 |
| 1.0 | 0.93 |
| 1.5 | 0.83 |

EXAMPLE III

The cell of previous examples was operated as before except that the temperature was raised 238° C., the oxygen pressure to 300 millimeters (12 inches) mercury and the hydrogen pressure to 100 millimeters (4 inches) mercury. During this run, current density was observed as a function of voltage. The current density of a cell is obtained by dividing its current output by the effective cross-sectional area of its electrodes, thereby affording a measure of the output which is essentially independent of electrode area. The results were as follows.

| Voltage: | Current density |
|---|---|
| 1.16 | 0.4 |
| 1.12 | 0.85 |
| 1.04 | 16.5 |
| 0.81 | 41 |
| 0.65 | 53 |
| 0.42 | 65.5 |

EXAMPLE IV

In order to determine the effect of an increase in temperature upon the operation of the cell under load, two consecutive experiments were performed at temperatures of 200° C. and 235° C., respectively, on the same test apparatus as in the previous examples, but utilizing an oxygen pressure of 350 mm. mercury and a hydrogen pressure of 150 mm. mercury. The results were as follows:

(A) Temperature=200° C.

| Voltage: | Current density |
|---|---|
| 1.21 | 0 |
| 0.9 | 13.6 |
| 0.785 | 17.25 |
| 0.71 | 25.3 |
| 0.41 | 35.5 |
| 0.11 | 39.8 |

(B) Temperature=235° C.

| Voltage: | Current density |
|---|---|
| 1.18 | 0 |
| 1.05 | 16.25 |
| 0.98 | 24.5 |
| 0.85 | 38.3 |
| 0.63 | 45.7 |
| 0.19 | 59.5 |

EXAMPLE V

The effect of increasing the pressure in the oxygen being supplied to the cell was explored in a series of experiments in which the operating temperature was maintained at 200° C. and the hydrogen pressure was maintained constant at 62.5 mm. mercury. In these experiments, a new set of standard Bacon electrodes was employed which gave an open circuit voltage, under these conditions, of 1.00 volt. The result of these experiments were as follows:

| Oxygen Pressure (mm. Hg) | Current | Voltage | Current Density |
|---|---|---|---|
| 180 | 2.0 | 0.7 | 16.28 |
| 275 | 2.8 | 0.68 | 22.85 |
| 500 | 7.5 | 0.68 | 61.05 |
| 550 | 11.0 | 0.60 | 89.54 |

The performance of this cell using the same electrodes under increasing load with the gas pressures being maintained constant at 62.5 mm. hydrogen and 150 mm. oxygen and the temperature at 210° C. was as follows.

| Voltage: | Current density |
|---|---|
| 0.98 | 0 |
| 0.7 | 16.4 |
| 0.625 | 26.2 |
| 0.46 | 51 |
| 0.14 | 98 |

EXAMPLE VI

The effect upon the operation of a change in the electrolyte composition was then determined by preparing a eutectic mixture consisting of 70% potassium hydroxide and 30% lithium hydroxide on a molar basis and replacing the electrolyte of the previous experiments with this mixture. The arrangement and operation of the cell was the same as before except that a fresh set of standard electrodes was present. Initial resistance tests on the assembled cell with the new electrolyte, carried out by means of a Wheatstone bridge and a thermionic oscillator operating at 1 kc. per second, gave values of 0.18 ohm at 232° C. and 0.04 ohm at 250° C. This cell was then tested at a constant temperature of 250° C. for the effect upon open circuit voltage of variations in oxygen and fuel pressures.

| Oxygen Pressure (mm.) | Open Circuit Voltage at Hydrogen Pressure (mm. Hg) of— | | | |
|---|---|---|---|---|
| | 75 | 150 | 225 | 300 |
| 750 | 0.90 | 0.88 | 0.96 | 1.11 |
| 150 | 0.92 | 1.09 | 1.095 | 1.12 |
| 225 | 0.93 | 1.10 | 1.105 | 1.125 |
| 300 | 1.00 | 1.12 | 1.12 | 1.13 |

The ability of this cell to operate under increasing current drain at a constant temperature of 230° C. and constant hydrogen and oxygen pressures of 280 mm. in each case was then determined with the following results.

| Voltage: | Current density |
|---|---|
| 1.13 | 0 |
| 0.825 | 19.5 |
| 0.71 | 54 |
| 0.26 | 118 |

EXAMPLE VII

The electrolyte container was replaced with a new welded nickel tank filled with fresh electrolyte of the same composition as before; fresh Bacon electrodes were installed, and the electrode spacer was modified to confine the electrolyte between the adjacent electrode faces and prevent free circulation with the main electrolyte bath, the space between these faces enclosed by the modified spacer being filled with electrolyte before operation. The new electrodes had been rated at a higher bubble pressure and it was therefore possible to raise them to 760 mm. Hg at the oxygen side and 755 mm. Hg at the hydrogen side. The temperature was held at 217° C. Observation of voltage and current density resulted in the following data.

| Voltage: | Current density |
|---|---|
| 1.20 | 0 |
| 0.98 | 17 |
| 0.929 | 57 |
| 0.75 | 85 |
| 0.65 | 126 |
| 0.62 | 136 |
| 0.44 | 205 |

EXAMPLE VIII

The effect of a ternary eutectic mixture is shown by an experiment employing as the eutectic a mixture of 105 mols lithium hydroxide, 0.43 mol sodium hydroxide, and 0.52 mol potassium hydroxide having a melting point of 167° C. and a specific resistance at this temperature of 1.22 ohms per cc. The operating temperature was 272° C., the oxygen pressure 6 p.s.i. and the hydrogen pressure 4 p.s.i. After an open circuit voltage of 1.16 was noted, a load was imposed with the following results.

| Voltage: | Current density |
|---|---|
| 1.14 | 8.2 |
| 1.06 | 40.8 |
| 0.95 | 89.7 |
| 0.73 | 163 |
| 0.48 | 241 |

Raising the gas pressure brought about some improvement. For example, with a gas pressure of 8 p.s.i. for oxygen and 5 p.s.i. for hydrogen, the voltage was 0.53 and the current density 249 ma./sq. cm., while when the oxygen pressure was raised to 10 p.s.i., the hydrogen pressure remaining at 5 p.s.i., a current density of 180 was obtained at a voltage of 0.85.

On the basis of the preceding experiments, several significant general conclusions can be drawn. First of all, the performance of the cell is strongly affected by an increase in its operating temperature, especially with reference to the ability to withstand substantially greater current drain at a given voltage. From the standpoint of low load or open circuit voltage, this voltage increases sharply with temperature until the melting point of the electrolyte is reached and more slowly thereafter, eventually leveling off to a more or less constant value. Similarly, cell performance is notably affected by the pressure at which the oxygen is supplied thereto and distinctly greater current drains are possible with increasing oxygen pressure. As a rule, an increase in hydrogen pressure does not have a comparable effect upon current drain capacity. On the other hand, open current voltage is affected roughly to the extent by an increase in either pressure until its maximum level is attained. Interestingly enough, once the flow rate of the gas is established at a level at which the cell is being adequately supplied, a substantial increase in that flow rate, e.g. a two-fold increase, produces only negligible results either with regard to the open current voltage of the cell or its ability to sustain higher currents. Changes produced by variation in the distance separating the adjacent electrode faces are, for the most part, not particularly significant. We have also observed that the cell can be shut down for periods of several hours or more without removal from the electrolyte and then reactivated without critically effecting its performance at least on a short-term basis. This is a valuable characteristic for situations where continuous on-load operation is not contemplated.

*Corrosion suppression*

Upon further experimentation with the improved electrolytes of the present invention, it was found that long periods of continuous on-load operation, say 24 hours or more, tended to seriously affect the performance of the cell and, in some cases, resulted in a total break-down, i.e. complete absence of current. Examination of the cell after such occurrences revealed that the electrodes, particularly that at the hydrogen side, had undergone an extreme superficial blackening which appeared to be the result of a corrosive oxidation. Tests revealed that the resistance of the oxidized areas had increased enormously, ranging from 80–500 ohms at such areas as compared with an initial resistance of 0.05–0.09 ohm. In addition, a heavy dark brownish or black deposit was found to be present at the bottom of the electrolyte container. Where structural elements of the cell were constructed of iron or steel, even stainless steel, these also exhibited a blackened condition. When the damaged electrodes, or the damaged hydrogen electrode alone, were replaced with new plates without any further alterations in the cell, the contaminated electrolyte even being retained, re-operation of the cell could be effected without difficulty, with performance characteristics differing no more from initial characteristics than the variations observed between different sets of electrodes. This fact and the increased resistance of the damaged electrodes indicated that the impairment in performance was not due merely to concentration polarization, i.e., an increase in internal cell resistance due to the massing of ions at the electrode surfaces, a condition commonly occurring in all cells after lengthy periods of operation. Use of a different electrolyte composition, as mentioned in the preceding example, did not result in an elimination of the attack upon the electrode although the extent of the damage was considerably less in the case of the lithium hydroxide-potassium hydroxide mixture than in the case of the sodium hydroxide-potassium hydroxide mixture.

A study of the system based on the electrolytes of the invention led to the theory that the hydroxide was reacting with the oxygen gas at the cathode to produce alkali metal oxides and peroxides plus hydroxyl ions which, upon migration through the electrolyte to the anode, combined with the adsorbed hydrogen gas to produce water. At the temperatures contemplated herein, the water of reaction evaporates from the system, resulting, in effect, in a consumption of hydroxyl ions during the overall cell reaction. With the hydroxyl ions being removed from the system, the kinetics of the reaction favor the production of alkali metal oxides and peroxides, and it was these compounds that were thought to be responsible for the attack upon the electrodes. These reactions may be summarized by the following formulae, using KOH to exemplify the electrolyte:

(1) At the oxygen electrode (cathode):

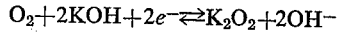

(2) At the hydrogen electrode (anode):

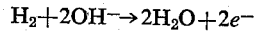

(3) In the electrolyte:

In order to confirm this theory, a series of static corrosion tests were carried out for 5 days at 240° C. in which standard Bacon electrodes and various structural materials were immersed in an equimolar mixture of sodium and potassium hydroxide to which was deliberately added sodium peroxide at three levels of concentration, 0.1%, 1% and 10%. At all three concentrations, the representative hydrogen electrodes were found to have undergone severe blackening coupled with extensive separation or delamination of the fine pore layer from the coarse pore layer, the extent of delamination increasing with the increasing peroxide concentration and become almost complete at the 10% level. In contrast, the oxygen electrode remained essentially unchanged at all concentration levels and appeared to be almost completely resistant to peroxide attack. Of the structural materials tested, both plain nickel and L-nickel (a low carbon nickel) were found to have acquired a black film which could rather easily be removed although there was no loss in tensile strength or other apparent damage. Silver, on the other hand, underwent no visible change to this treatment irrespective of peroxide concentration.

In the light of this confirmatory evidence, it was theorized that the depletion or consumption of hydroxyl ions during the cell reaction could be counteracted if a sufficient quantity of excess hydroxyl ions to substantially balance those being consumed were deliberately supplied to the cell. Although the corrosive attack took place preferentially upon the hydrogen electrodes (anode), reaction (1) above indicated that peroxide formation would be expected to occur at the oxygen electrode or cathode. Thus, it was reasoned that if a supply of hydroxyl ions was made available at the oxygen electrode, the production of oxides and peroxides could be minimized, or eliminated entirely, with a concommitant reduction in damage to the hydrogen electrode. Accordingly, the design of the overall system was modified in the manner indicated in FIG. 1 to permit the introduction into the gas chamber at the oxygen electrode sub-assembly of water vapor along with the oxygen. When this was done, and water vapor was injected into the oxygen line, the results met all expectations and cell performance could be maintained at high levels for much greater periods of time.

Obviously, there are a variety of ways in which water vapor, e.g. steam, can be introduced into the oxygen supply stream. One very simple arrangement is to provide a closed container of water held at a sufficiently elevated temperature to maintain an atmosphere of water vapor above the water level at the desired partial pressure, and pass the oxygen through this container on its way to the cell, the oxygen pressure being controlled to maintain the desired molar balance of oxygen and water vapor in the mixture. Alternatively, a steam generator can be maintained at the desired pressure from which the steam is fed into the oxygen line at the desired pressure and rate. Other arrangements are quite conceivable and it will be appreciated that the choice of the particular arrangement is not a critical aspect of the invention.

As regards amount of water vapor to be injected into the oxygen gas stream to suppress the formation of oxides in the electrolyte, theoretical considerations would suggest that two mols of water per mol of oxygen would be the required quantity. This conslusion follows from reaction (2) set forth above, according to which two molecules of water are produced by the reaction of each molecule of hydrogen gas at the anode, each two molecules of water thus produced consuming two hydroxyl ions. Since, as appears from reaction (1), these hydroxyl ions are derived from the electrolyte, one would reasonably expect that the same number of molecules of water should be resupplied at the oxygen electrode, each molecule of water providing one hydroxyl ion. Under actual conditions of operation, however, we found that while introduction of water vapor at the ratio of 2 mols per mol of oxygen gas gave reasonable levels of performance over the short term, a significant decrease in performance could be observed when the experiments were extended for longer periods.

The precise cause of deterioration in performance is not fully understood. Apparently, it can be explained on the basis that less than the theoretical quantity of water was actually being utilized at the oxygen electrode, causing a shift in the equilibrium partial pressures of the water vapor and oxygen gas in the gas cavity of the oxygen electrode which could, in time, lead to the condensation of liquid water in sufficient quantity to flood or drown a proportion of the pores of the electrode. The probable accuracy of this explanation was confirmed by the fact that, after operation for some time accompanied by a drop in performance, the initial performance level of the cell could be regained by periodically opening the outlet valve of the oxygen electrode sub-assembly. Presumably, venting of the oxygen gas chamber to the atmosphere allowed the accumulated water to be carried away in the escaping gas stream, restoring the cell to its initial condition. As far as we can determine, the effects on the cell of water accumulation at the oxygen electrode followed by elimination through venting are purely temporary and lead to no permanent impairment in performance; we have been able, for example, to carry a cell through a number of such cycles and in each instance, the initial level of performance was retained without difficulty.

One encouraging aspect of this phenomenon was the tendency for the rate at which impairment occurred to vary as a function of current drain, the change being much slower at low currents than at higher currents. This suggests that under conditions requiring only a low output, the loss in performance due to water accumulation might be tolerated for moderately long periods. Once appreciable deterioration has been experienced, recovery of the cell to its initial output takes place at a relatively slow rate, dependent to some extent, of course, upon the total amount of water that has been allowed to accumulate before the chamber is vented. Recovery is facilitated by removing the load from the cell so as to avoid introducing fresh water, as a result of the overall cell reaction, which would also have to be removed. It is to be expected that if venting were effected before the substantial deterioration had occurred, recovery would come sooner. Similarly, if the outlet valve from the cavity were maintained slightly open on a continuous basis, a decrease in output should be minimized or avoided altogether.

A specific rate at which the water vapor might be supplied to a given cell for optimum performance cannot be stated with any degree of exactness since it will vary with the rate of reaction which is, in turn, dependent upon the conditions, especially the current drain, under which the cell is operated. In general, however, one may expect that the water vapor should be supplied in the range of about 0.5 to about 1.5 mols per mol of oxygen gas. Once the cell is operating at a steady rate, one will have no difficulty in determining by trial and error that value within this range which gives best results.

From what has been said in this section, it will be realized that the electrolyte will, in all probability, contain some water, at least where the cell has been in operation for a considerable period. Reference has already been made to evidence indicative of this fact. In addition, the hydroxides constituting the eutectic electrolyte of the invention are known to be hydroscopic and some may contain water of hydration. At the contemplated operating temperatures, however, the electrolyte will tend to rid itself, through evaporation, of water absorbed therein. Dilution to some extent of the electrolyte being virtually unavoidable, the invention should not be restricted to the strict absence of all water from the electrolyte and the use of the term "eutectic" in the claims and elsewhere will be understood as permitting the presence of water in minor amounts due to natural factors as distinguished from the deliberate selection of an aqueous electrolyte solution or the deliberate addition of substantial amounts of water to produce such a solution.

The following experiments illustrate the operation of the cell with the injection or introduction of water vapor at the oxygen electrode.

EXAMPLE IX

A cell generally similar to that of the figure, except that water vapor supplied by maintaining a flask of water at 70° C. and passing the oxygen gas through the flask on its way to the oxygen electrode sub-assembly, was tested. The electrolyte was an equimolar mixture of sodium and potassium hydroxide, the operating temperature was 230° C. and the electrodes were standard Bacon electrodes. Two series of experiments were run, one in which the pressure of the oxygen gas upstream of the water flask was 600 mm. Hg and the other in which this pressure was reduced to 300 mm. Hg, the hydrogen pressure being maintained constant at 300 mm. Hg. The load imposed on the cell was varied during the two experiments to observe the relationship between voltage and current density. At least four observations were recorded during each experiment and the data thus obtained were plotted. The following results were taken from this plot at the same voltage levels for ease of comparison:

| Voltage | Current Density at Pressure of Oxygen | |
|---|---|---|
| | 600 mm. Hg | 300 mm. Hg |
| 1.2 | 0 | 0 |
| 1.0 | 47 | 42.5 |
| 0.8 | 90 | 67.5 |
| 0.6 | 133 | 88 |
| 0.41 | 173.5 | 100.5 |
| 0.275 | — | 107 |

— Indicates in this and subsequent examples that no reading was taken at this voltage.

EXAMPLE X

A series of experiments similar to those of Example IX were carried out with a cell utilizing standard Bacon electrodes, an equimolar mixture of sodium and potassium hydroxides as the electrolyte, and an operating temperature of 230° C. The initial static resistance of the cell was 0.02 ohm. During these experiments, each of the hydrogen and oxygen pressures were maintained first at 600 mm. Hg and then at 300 mm. Hg while the current drain on the cell was increased, the oxygen pressure being that of the oxygen gas alone. In each instance, the water vapor and oxygen gas were maintained at an equilibrium ratio such as to provide two mols of water for each mol of oxygen gas. For example, the water bath supplying the water vapor was heated to 67° C. to provide a partial water vapor pressure of approximately 200 mm. Hg. As before, the results of at least four observations for each experiment were plotted and the following were read from this plot at the stated common voltage:

| Voltage | Current Density at Respective Electrode Pressures of— | | | |
|---|---|---|---|---|
| | O, H-600 mm. | O-300 mm. H-600 mm. | O, H-600 mm. | O-600 mm. H-300 mm. |
| 1.2-1.23 | 0 | 0 | 0 | 0 |
| 1.1 | 20 | 23 | 26 | 28 |
| 1.0 | 41 | 44 | 47.5 | 50 |
| 0.8 | 75 | 70 | 90 | 90 |
| 0.6 | 89 | 86 | 134 | 118 |
| 0.4 | 98 | 99 | 177 | 144 |
| 0.25 | 103 | 108 | | |

All pressures expressed in mm. Hg.

EXAMPLE XI

The effect of supplying water vapor to the cell was illustrated in rather dramatic fashion by an accident which occurred during the continued testing of the cell of Example X. In all, this cell was intermittently tested over a period of six days, during which time it was started up, run for a few hours, and then shut down, for example over night, several times. The total time of actual operation during this period (144 hours) was 48 hours with a total current drain of 387 ampere hours. The performance of the cell during the actual operating time was quite satisfactory until the end of the sixth day when the open current voltage was observed to have dropped from its normal value of 1.2 volts to 0.1 volts. A check revealed that a temperature of the water supply bath had accidentally decreased to 30° C., at which the partial pressure of the water pressure vapor would be 32° mm. Hg. When the electrolyte was examined, a blackened condition was noted while a test of the cell resistance showed an increase from the initial value of 0.2 ohm to 4.3 ohms. The cell itself was then dismantled and scrutinized, the hydrogen electrode being found to have turned black due to a coating of freely removable black deposit and to have undergone an increase in resistance from 0.002 ohm to 1.223 ohms.

In the preceding discussion and examples, the introduction of water vapor has been described in connection with a cell utilizing one of the eutectic electrolytes of the invention. However, as is apparent from the reactions set forth above, in particular, reaction (1), the advantages to be derived from this feature are not restricted to eutectic mixtures but extend equally to any alkaline hydroxide electrolyte which is used in a substantially water-free condition and is characterized by a corrosive tendency toward at least the fuel electrode. Consequently, while this feature finds a preferred application in connection with eutectic mixtures as described herein, its utility should not be construed as confined to these particular electrolytes.

Fuels other than hydrogen

Most of the work in connection with the discoveries of the present invention has been based on the use of hydrogen gas as the fuel gas of the cell as will have been observed from the preceding examples. However, we are reasonably convinced that other fuels known to have utility in fuel cells can be substituted for hydrogen gas. For example, carbonaceous fuels can be employed, at least for short term use where a concentration polarization effect due to the build-up of carbonates in the electrolyte can be tolerated.

Those skilled in the art will understand the practical impossibility of attempting to illustrate and describe all conceivable variations and modifications inherent in the several aspects of the invention. Indeed, it is only possible here to explain and define the general parameters of these aspects with sufficient accompanying illustrations as to acquaint the skilled worker with their value and provide sufficient fundamental knowledge to enable him to determine through the exercise of ordinary skill further variations in their application. Under these circumstances, the scope of the invention in all of its forms should not be understood as limited to the specific embodiments that have been described.

Having thus described our invention, what is claimed as new and patentable is:

1. In a method for the production of electrical energy by the reaction of an oxidizing gas, which is a source of free oxygen and a fuel in an electro-chemical cell having a metallic fuel electrode and an oxidizing electrode in contact with a substantially water-free alkaline hydroxide electrolyte, at least said oxidizing electrode being of the gaseous diffusion type, the step of suppressing the corrosive tendencies of said hydroxide with respect to said metallic electrode by maintaining said oxidizing electrode in contact with water vapor.

2. The method of claim 1 wherein said oxidizing electrode includes a gas chamber defined at least in part by a porous electrode element, and into which the oxidizing gas is introduced, the gas in said chamber being isolated from said electrolyte except through the pores of said element, said water vapor being supplied to said chamber for contact with said porous element.

3. The method of claim 2 wherein said water vapor is supplied at a ratio of not greater than about 2 mols per mol of oxygen gas introduced into said chamber.

4. The method of claim 3 including the further step of removing from said gas chamber any water in excess of that absorbed by the electrolyte during the reaction.

5. The method of claim 4 wherein said gas chamber is provided with an outlet adapted to be opened and closed and said excess water is removed by at least periodically opening said outlet.

6. The method of claim 3 wherein said water vapor is supplied at a ratio of from about 0.5 to about 1.5 mols per mol of oxygen gas and at a rate substantially equal to the rate at which the vapor is absorbed by said electrolyte during the reaction.

References Cited

UNITED STATES PATENTS

| | | | |
|---|---|---|---|
| 2,384,463 | 9/1945 | Gunn et al. | 136—86 |
| 2,914,596 | 11/1954 | Gorin et al. | 136—86 |
| 3,002,039 | 9/1961 | Bacon | 136—86 |
| 3,026,364 | 3/1962 | Jackson et al. | 136—86 |
| 3,106,494 | 10/1963 | Thorsheim | 136—86 |
| 3,146,131 | 8/1964 | Linden et al. | 136—86 |
| 3,155,547 | 11/1964 | Siebker | 136—86 |

ALLEN B. CURTIS, *Primary Examiner.*

JOHN R. SPECK, WINSTON A. DOUGLAS, *Examiners.*

H. FEELEY, *Assistant Examiner.*